(12) United States Patent
Yang et al.

(10) Patent No.: US 8,432,975 B2
(45) Date of Patent: Apr. 30, 2013

(54) APPARATUS AND METHOD FOR PROCESSING A PICTURE FRAME

(75) Inventors: Ya-Jung Yang, Taichung (TW); Chi-Cheng Ju, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 1271 days.

(21) Appl. No.: 12/009,351

(22) Filed: Jan. 18, 2008

(65) Prior Publication Data

US 2009/0185624 A1 Jul. 23, 2009

(51) Int. Cl.
*H04N 7/12* (2006.01)
*G06K 9/36* (2006.01)

(52) U.S. Cl.
USPC ............ 375/240.24; 375/240.12; 375/240.29; 382/232

(58) Field of Classification Search ............ 375/240.16–240.24, 240.25–24, 240–25; 348/590–596, 348/699–700; 382/232–249
See application file for complete search history.

(56) References Cited

U.S. PATENT DOCUMENTS

| | | | | |
|---|---|---|---|---|
| 6,570,923 | B2* | 5/2003 | Saunders et al. | 375/240.16 |
| 7,471,724 | B2* | 12/2008 | Lee | 375/240.12 |
| 7,599,438 | B2* | 10/2009 | Holcomb et al. | 375/240.23 |
| 7,630,438 | B2* | 12/2009 | Mukerjee et al. | 375/240.16 |
| 7,684,626 | B1* | 3/2010 | Cote et al. | 382/232 |
| 7,953,161 | B2* | 5/2011 | Gordon | 375/240.29 |
| 2003/0187824 | A1 | 10/2003 | MacInnis et al. | |
| 2004/0228415 | A1* | 11/2004 | Wang | 375/240.29 |
| 2005/0259744 | A1 | 11/2005 | Hellman | |
| 2006/0023954 | A1* | 2/2006 | Ishizuka et al. | 382/232 |
| 2006/0083314 | A1 | 4/2006 | Cooper et al. | |
| 2006/0083316 | A1* | 4/2006 | Cooper et al. | 375/240.25 |
| 2006/0115175 | A1 | 6/2006 | Cooper et al. | |
| 2006/0262862 | A1 | 11/2006 | Cheng et al. | |
| 2007/0036452 | A1 | 2/2007 | Llach et al. | |
| 2007/0070241 | A1 | 3/2007 | Boyce et al. | |
| 2007/0117291 | A1 | 5/2007 | Cooper et al. | |
| 2007/0147511 | A1 | 6/2007 | Ogawa et al. | |
| 2007/0160138 | A1* | 7/2007 | Wedi et al. | 375/240.03 |
| 2007/0171979 | A1* | 7/2007 | Eerenberg et al. | 375/240.24 |
| 2008/0043852 | A1 | 2/2008 | Park et al. | |
| 2009/0046783 | A1* | 2/2009 | Chen et al. | 375/240.24 |
| 2009/0122870 | A1* | 5/2009 | Sadowski et al. | 375/240.24 |

FOREIGN PATENT DOCUMENTS

| | | |
|---|---|---|
| CN | 1870752 A | 11/2006 |
| JP | 2007-67945 A | 3/2007 |
| KR | 10-0771879 B1 | 11/2007 |
| TW | I264951 | 10/2006 |

OTHER PUBLICATIONS

China Office Action mailed Apr. 7, 2011.
English translation of abstract of CN 1870752 A.
English translation of abstract of JP 2007-67945 A.
Taiwan Office Action dated Nov. 28, 2011.

* cited by examiner

*Primary Examiner* — Man Phan
(74) *Attorney, Agent, or Firm* — McClure, Qualey & Rodack, LLP

(57) ABSTRACT

Apparatuses and methods for processing a picture frame are provided. The apparatus comprises a decoder, a memory, and an image processing unit. The decoder decodes blocks of the picture frame and deblocks decoded blocks to generate deblocked blocks. The memory stores the decoded blocks and deblocked blocks. The image processing unit acquires decoded or deblocked blocks through different paths, for example, from the decoder or from both the decoder and memory depending on whether a next MB row is required for deblocking.

16 Claims, 5 Drawing Sheets

APPARATUS AND METHOD FOR PROCESSING A PICTURE FRAME

CROSS-REFERENCES TO RELATED APPLICATIONS

Not applicable.

BACKGROUND OF THE INVENTION

1. Field of the Invention

The present invention relates to video processing; more specifically, the present invention relates to processing a picture frame with fewer memory accesses.

2. Descriptions of the Related Art

Films commonly appear grainy in images and video as a result of the physical granularity of photographic emulsions. The film grain makes the images and videos look more vivid and creates an artistic effect. Without film grain, the objects and people in the images and videos look plastic.

Although film grain provides the aforementioned advantages, it is hard to preserve the film grain when an image/video is encoded or compressed. The reason is that film grain is a mid-frequency noise-like pattern, which comprises high entropy and is hard to encode in only a few bits.

A solution to the aforementioned problem is to remove, model, and synthesize film grains during encoding/compression and decoding/decompression, which is also referred to as film grain technology. More specifically, film grain on an image or a video frame is removed during encoding/compression to achieve a good compression rate. When a decoder receives a bitstream, it models the film grain, retrieves supplemental enhancement information, and synthesizes the bitstream with the supplemental enhancement information to derive the resultant image with the film grain.

FIG. 1 illustrates a video decoder 1 with film grain technology. The video decoder 1 comprises a decoder 11, an averaging unit 13, a static random access memory (SRAM) 14, a searching unit 15, a pseudo random number generator (PRNG) 16, a database (DB) retrieving unit 17, an enhancing apparatus 18, and a dynamic random access memory (DRAM) 19.

Please refer to FIG. 1B, which illustrates the concept of a video frame 10. A video clip is usually encoded as a plurality of frames 10. Each of the frames 10 is encoded as a plurality of 16×16 macroblocks (MBs). Each of the macroblocks 10a is encoded as four luminance blocks 10b and two chrominance blocks 10c. The dimension of each block is 8×8 in pixels.

The decoder 11 decodes a received bitstream 101 to derive a decoded macroblock, i.e. four luminance blocks and two chrominance blocks. Since a video frame is block-based encoded/decoded, there are boundaries between blocks. In order to have pleasantly decoded video frames, the decoder 11 further deblocks the decoded macroblock to remove the boundary effect. After deblocking, the deblocked macroblock 103 stores in the DRAM 19 for later reference. The deblocked macroblocks are retrieved from the DRAM 19 for conducting a next video/image processing stage such as film grain processing as shown in FIG. 1A.

For each of the six blocks, the averaging unit 13 averages its pixel values and derives an averaged value 104. The searching unit 15 then uses the averaged value 104 to search the DRAM 19 for supplemental enhancement information (SEI) 105. Meantime, the PRNG 16 generates a random number 106 according to the decoded macroblock 102. The database retrieving unit 17 then retrieves corresponding detailed information 107 according to the SEI 105 and the random number 106. Finally, the enhancing apparatus 18 enhances the deblocked macroblock 103 using the corresponding detailed information 107 to produce an enhanced macroblock 108. The enhanced macroblock is then displayed on a screen or stored in the DRAM 19.

The drawback of the aforementioned arrangement is that it requires a large amount of DRAM 19 access and requires large DRAMs to store the deblocked macroblock 103 for implementing film grain technology. As a result, this drawback places a lot of burden on the DRAM 19 and degrades the decoding efficiency.

SUMMARY OF THE INVENTION

An object of the present invention is to reduce the DRAM bandwidth required during film grain processing in video decoding.

An apparatus comprises a decoder, a memory, and an image processing unit, for processing a picture frame comprising a plurality of macroblocks (MB), where each MB comprises a plurality of blocks. The decoder is configured to decode to generate decoded blocks and to deblock the decoded blocks to remove visual blocking effect thereby generating deblocked blocks. The memory is configured to store the decoded blocks and deblocked blocks. The image processing unit is configured to receive a deblocked block from the decoder or from both the decoder and memory for compensating for visual preference. The decoder transmits a deblocked block to the image processing unit directly when deblocking of the decoded block does not require data of a next MB row. The image processing unit retrieves a first portion of a deblocked block from the memory and a second portion of the deblocked block from the decoder when deblocking of the decoded block requires data of the next MB row.

A method for processing a picture frame comprises the steps of: decoding a block of an MB to generate a decoded block; determining if deblocking of the decoded block requires data of a next MB row; if the next MB row is not required, deblocking the decoded block and transmitting the deblocked block to an image processing unit; and the image processing unit compensating the deblocked block for visual preference.

If the next MB row is required for deblocking, the method further comprising deblocking a first portion of the decoded block; storing the deblocked first portion into a memory; storing a second portion of the decoded block into the memory; accessing the second portion of the decoded block from the memory for deblocking when the data of the next MB row is available; transmitting the deblocked second portion to the image processing unit directly after deblocking and transmitting the deblocked first portion from the memory to the image processing unit.

The present invention distinguishes video blocks that requires data of a next MB row for deblocking and that does not require data of a next row. For the blocks do not require data of a next MB row for deblocking, the image processing unit retrieves the deblock blocks directly from the decoder, which saves one read process from the memory.

For the blocks require data of a next MB row for deblocking, the prior art method comprises writing the entire decoded block to the memory, reading the entire decoded block out for deblocking when the next MB row is available, then writing the deblocked block back to the memory to allow the image processing unit accessing the deblocked block. An embodiment of the present invention segments the decoded block into a first and a second portion before writing it into the memory. Deblocking of the first portion does not require information of the next MB row, so the first portion is deblocked and then writes into the memory. Deblocking of the second portion, however, does require information of the next MB row, so the decoded second portion is first written into the memory, and read out for deblocking. The deblocked second portion can be sent to the image processing unit directly from the decoder, whereas the deblocked first portion is read from the memory and send to the image processing unit.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides apparatuses and methods to decode, deblock, and post-process a picture frame. The post-processing after decoding or after decoding and deblocking may include film grain technology (FGT), scaling, de-interlacing, etc. Each picture frame comprises a plurality of macroblocks (MBs), and each of the MBs comprises a plurality of blocks.

Figure 1A:
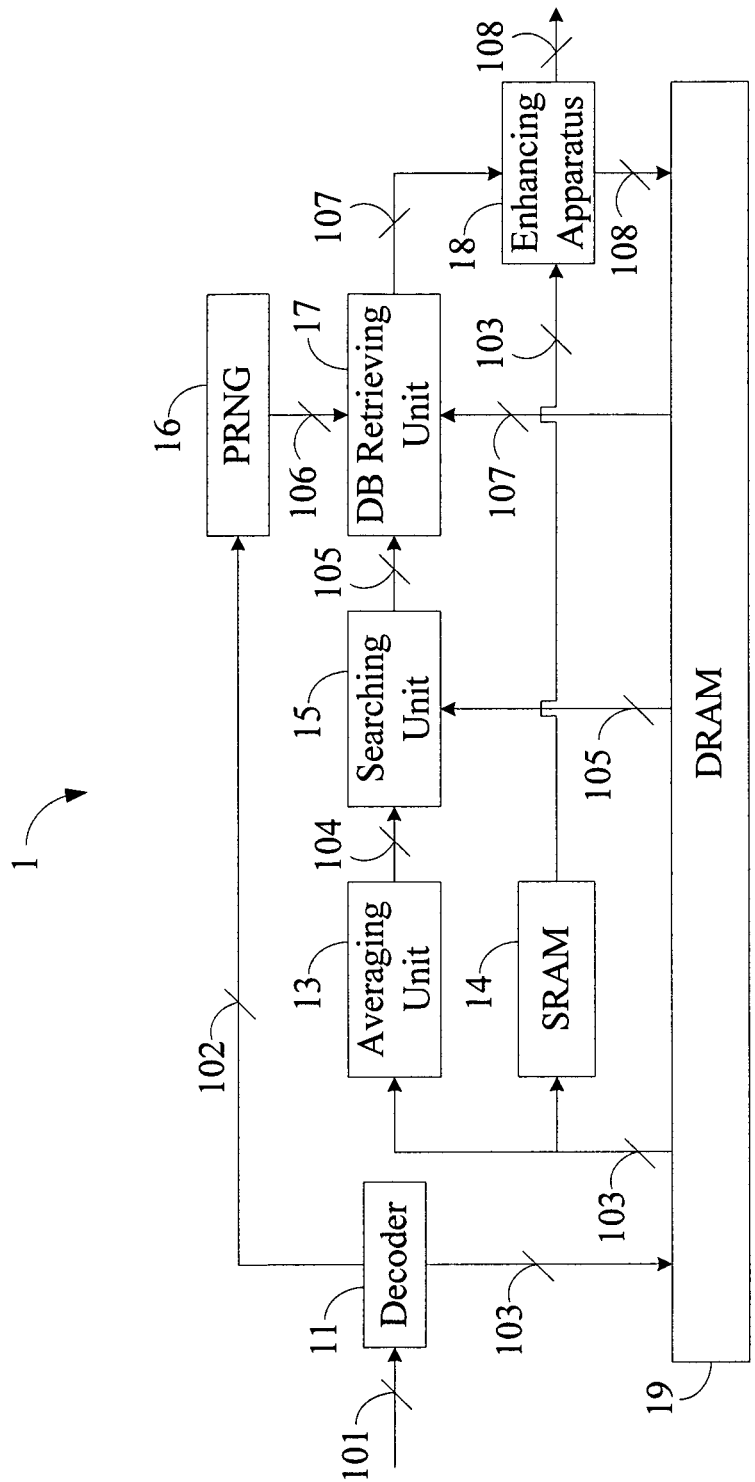
FIG. 1A illustrates a video decoder with film grain technology of the prior art.
Figure 1B:
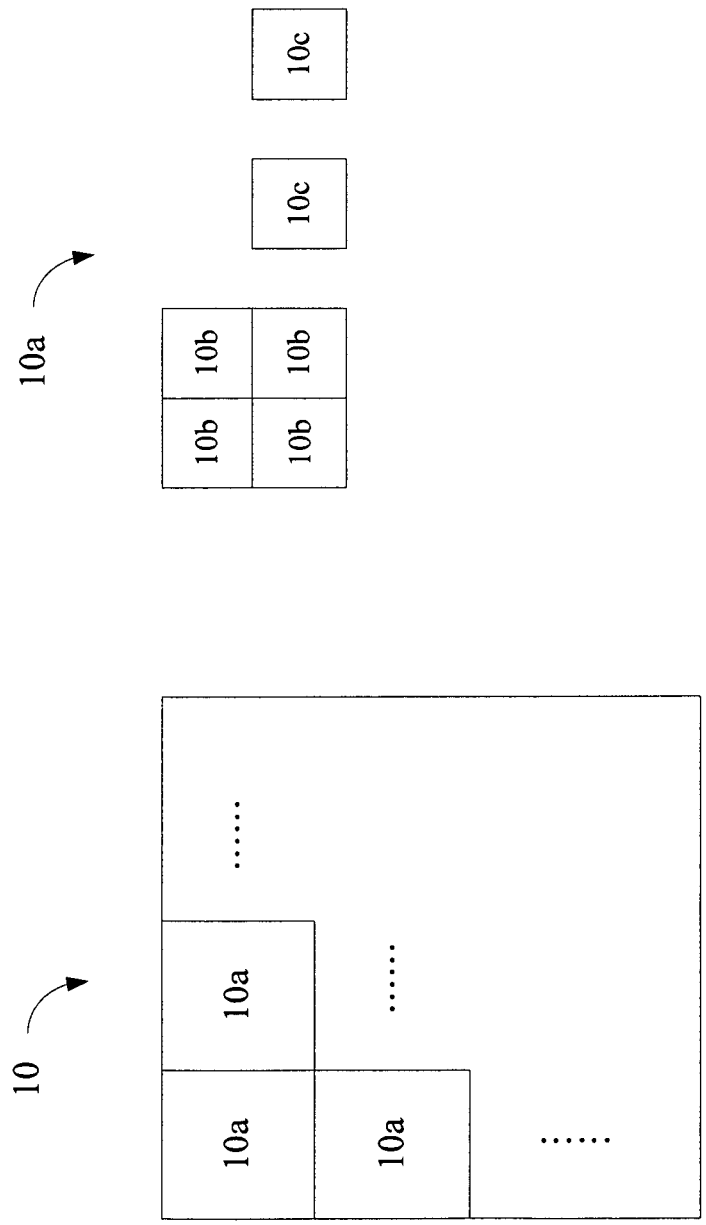
FIG. 1B illustrates a structure of an image/video frame.
Figure 2A:
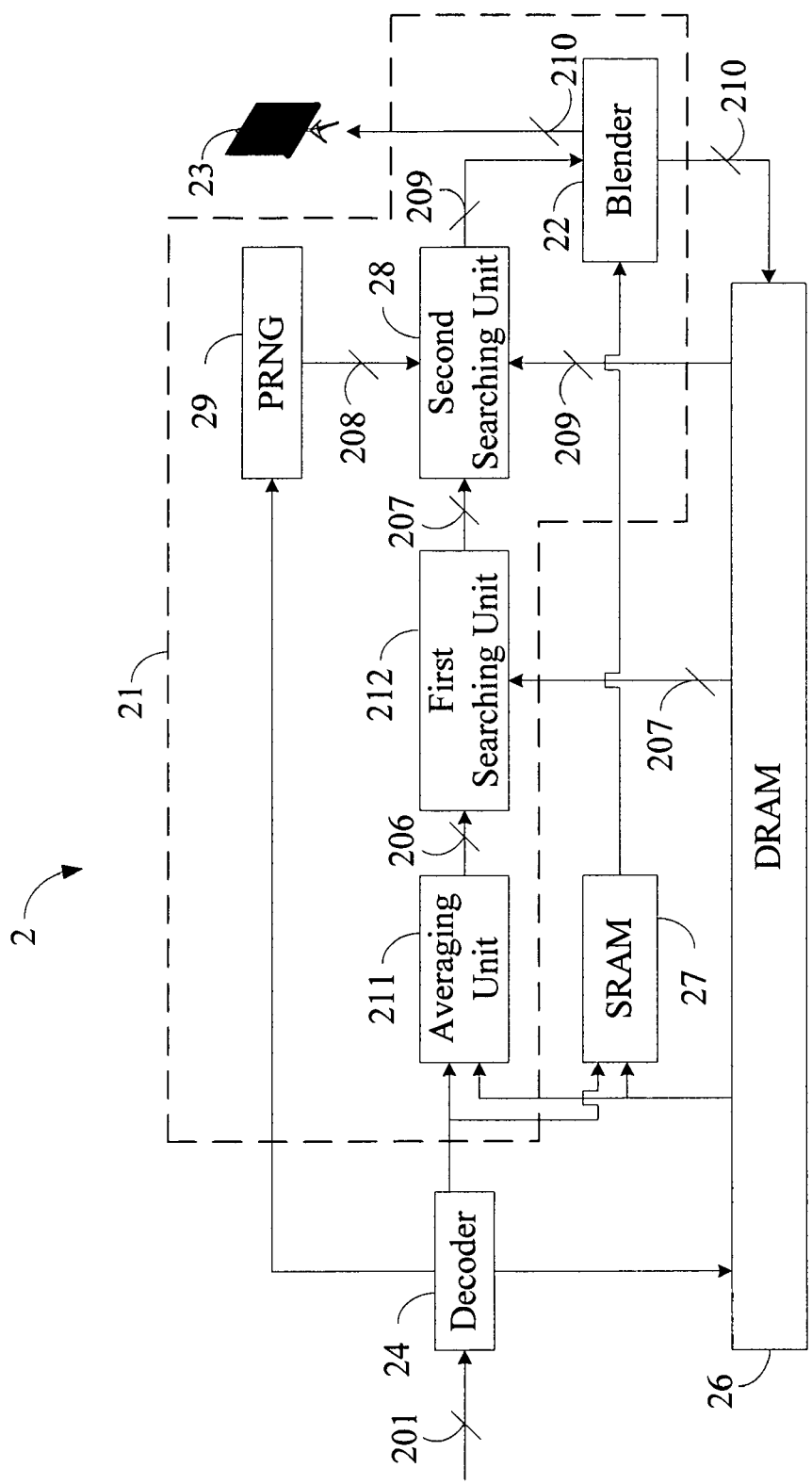
FIG. 2A illustrates an embodiment of the apparatus according to the present invention.

FIG. 2A illustrates a first embodiment of the present invention, which is an HD-DVD system 2. The HD-DVD system 2 is H.264 compatible and comprises an image processing unit 21, a displaying unit 23, a decoder 24, a DRAM 26, and an SRAM 27. The image processing unit 21 in this embodiment is a film grain technology (FGT) processing unit, which comprises an averaging unit 211, a first searching unit 212, a second searching unit 28, a blender 22, and a pseudo random number generator (PRNG) 29.

The HD-DVD system 2 of the first embodiment is capable of deblocking and post-processing a picture frame with fewer accesses of the DRAM 26. The decoder 24 is configured to perform decoding to generate decoded blocks and to deblock the decoded blocks to remove visual blocking effect and generate deblocked blocks.

Figure 2B:
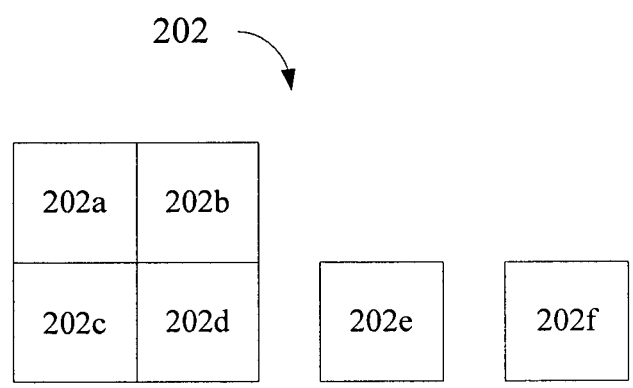
FIG. 2B illustrates a structure of a decoded video macroblock.

Initially, the decoder 24 decodes a received bitstream 201 to generate a decoded macroblock 202 by an H.264 decoding algorithm. As shown in FIG. 2B, the decoded macroblock 202 is a 16×16 two-dimensional macroblock which comprises four luminance blocks 202a, 202b, 202c, 202d and two chrominance blocks 202e, 202f. Each of the six blocks is an 8×8 block.

In one embodiment, the decoder 24 checks a picture header of the picture frame to determine if deblocking is required. If the picture header indicates deblocking is not required, the decoder disables relative deblocking functions and sequentially transmits the decoded blocks to the image processing unit 21 for compensating the decoded blocks for visual preference.

On the other hand, if deblocking is required, either indicated by the picture header as described in the above embodiment, or predetermined in the other embodiments, the decoder 24 further determines whether a next MB row is required for deblocking the current MB. That is, there are two situations; one does not require a next MB row for its deblocking process, while the other one requires a next MB row. When deblocking of the decoded block that does not require data of a next MB row, the decoder 24 deblocks the decoded blocks for removing visual blocking effect to generate deblocked blocks and the deblocked block can be directly transmitted to the image processing unit 21 for post processing. The image processing unit 21 directly receives a deblocked block from the decoder 24 in this embodiment.

When deblocking of the decoded block requires data of the next MB row, a decoded block is considered to be divided into a first portion and a second portion. The first portion does not require data of the next MB row for deblocking and the second portion requires data of the next MB row for deblocking. To be more specific, the second portion comprises the last N rows of the decoded block, wherein N is predetermined by a corresponding encoder, for example, N=4 for 8×8 decoded blocks. After decoding, the decoder 24 deblocks the first portion of the decoded block but does nothing to the second portion of the decoded block. Then, the decoder 24 stores the deblocked first portion and the un-deblocked second portion in the DRAM 26. When the data of the next MB row is available, the decoder 24 retrieves the un-deblocked second portion from the DRAM 26 and then deblocks the second portion. After deblocking the second portion, the decoder 24 transmits the deblocked second portion to the image processing unit 21. From the viewpoint of the image processing unit 21, it retrieves the first portion of a deblocked block from the DRAM 26 and a second portion of the deblocked block from the decoder 24.

As mentioned, the image processing unit 21 receives the second portion of the deblocked block from the decoder 24 and retrieves the first portion of the deblocked block from the DRAM 26. As the image processing unit 21 executes FGT processing in this embodiment, the averaging unit 211 calculates an average value of pixels in each deblocked block. That is, the averaging unit 211 averages each of the 4 luminance blocks and the 2 chrominance blocks. For example, the values of the 8×8 pixels of the block are average to derive an averaged value 206. The first searching unit 212 searches a lookup table in the DRAM 26 according to the average value 206 to derive supplemental enhancement information 207 of the deblocked block.

Meanwhile, the PRNG 29 generates a reference value 208 based on a predefined random number. The second searching unit 28 then generates film grain compensating values 209 for the deblocked block based on searching a database with supplemental enhancement information 207 and the reference value 208. Finally, the blender 22 combines the film grain compensating values 209 with pixels of the deblocked block to derive an enhanced video block 210.

In other embodiments, the image processing unit 21 may be a scaler for scaling the deblocked blocks into desired dimensions. In some other embodiments, the image processing unit 21 may also be a deinterlacer for deinterlacing the deblocked blocks.

Compared to the prior art, pixels of blocks that do not require a next MB row for deblocking can be transmitted to the image processing unit 21 directly after deblocking. For example, the decoded blocks 202a and 202b do not require a next MB row during deblocking, whereas the decoded blocks 202c, 202d, 202e, 202f have to wait till the next MB row is available for conducting deblocking. For each of the decoded blocks 202c, 202d, 202e, 202f in this embodiment, only the last four rows of the block require information of the next MB row for deblocking, so the first four rows are referred to as the first portion and the last four rows are referred to as the second portion. Some embodiments may reduce the DRAM bandwidth during deblocking and post-processing the two luminance blocks 202a and 202b, since the decoded blocks 202a and 202b can be deblocked without temporarily stored in the DRAM 26, and after deblocking, the deblocked blocks can be directly transmitted to the image processing unit 21 for post processing. The upper four rows of the four blocks 202c, 202d, 202e, 202f, that is, the first portions, can be deblocked without temporally buffering in the DRAM 26 until the next MB row is available, and then each of the deblocked first portions is buffered in the DRAM 26 until the corresponding second portion is deblocked. The lower four rows of the four blocks, 202c, 202d, 202e, 202f, that is, the second portions, are temporally stored in the DRAM 26 until the information of the next MB row is ready, the decoder 24 reads each of the second portions from the DRAM 26 and conducts deblocking to generated a deblocked second portion. The deblocked second portion can be directly send to the image processing unit, and the image processing unit also acquires the corresponding deblocked first portion from the DRAM 26 for conducting post-processing for the entire deblocked block.

Unless indicated by headers that this particular frame will not be reference by other frames, all of the deblocked luminance and chrominance blocks are written into the memory, e.g. DRAM 26, as reference of other macroblocks in the same or different for deblocking or decoding (e.g. motion compensation). The embodiments of the present invention are capable of reducing DRAM bandwidth by one read operation and one write operation when decoding, deblocking, and post processing first portions, and blocks not requiring a next MB row for deblocking. According to the embodiments, one read operation can also be omitted when decoding, deblocking, and post processing second portions.

According to the aforementioned arrangement, the HD-DVD system 2 is capable of decoding and post processing video with less amount of memory access and memory space.

Figure 3:
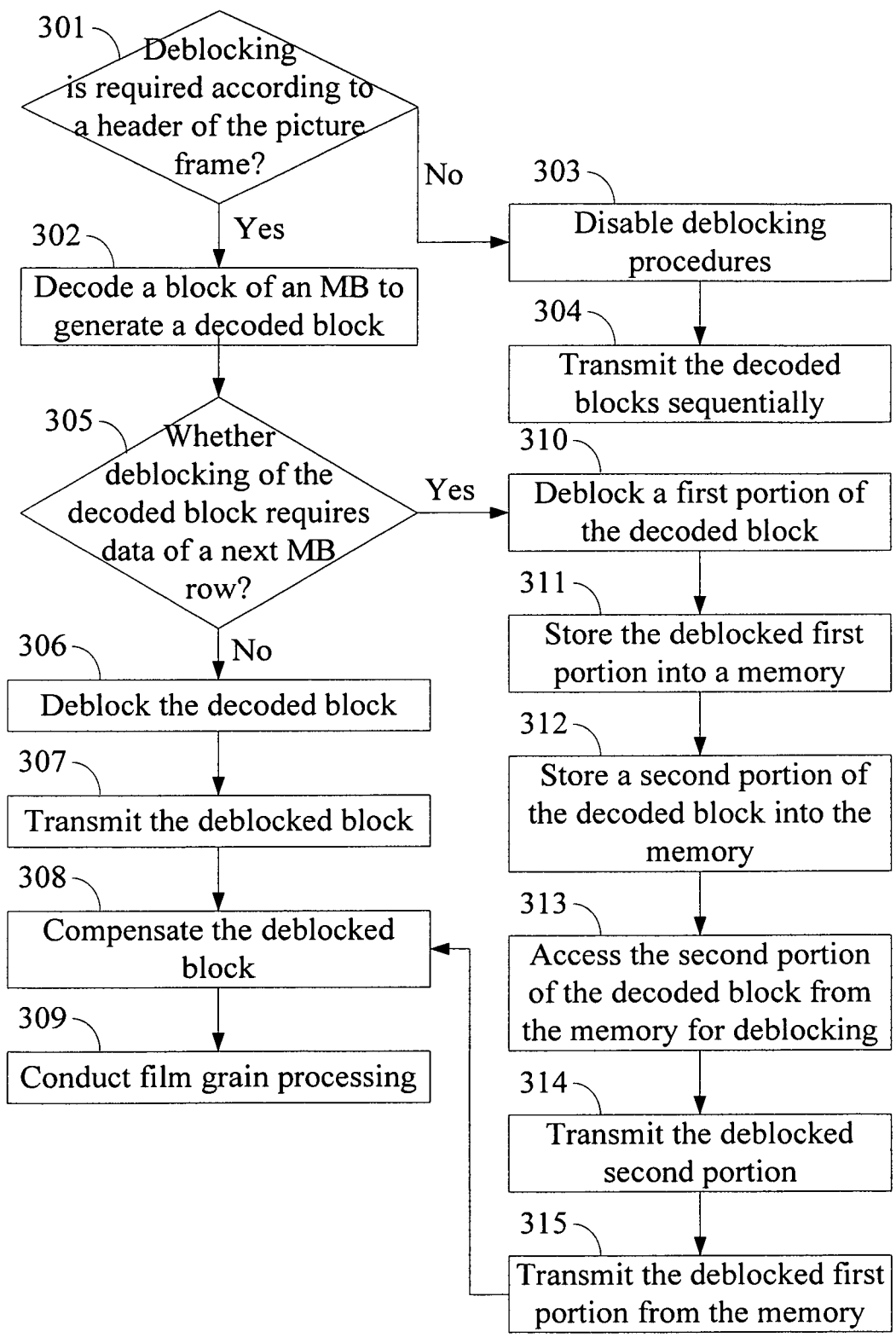
FIG. 3 is a flowchart illustrating an embodiment of the method according to the present invention.

FIG. 3 illustrates an exemplary method of the present invention.

Step 301 is executed to determine whether deblocking is required according to a picture header of the picture frame. If the picture header indicates that deblocking is not required for the current picture frame, step 303 is executed to disable deblocking relevant procedures. In some other embodiments, step 301 is omitted so that deblocking is performed for each picture frame. Step 304 is executed to decode each block and transmits the decoded blocks to an image processing unit sequentially for compensating for visual preference.

If deblocking is required, step 301 is executed to decode a block of an MB to generate a decoded block, and step 305 is executed to determine whether deblocking of the current decoded block requires data of a next MB row. If data of the next MB is not required for deblocking, step 306 is executed to deblock the decoded block to derive a deblocked block. Then, step 307 is executed to transmit the deblocked block to an image processing unit. Next, step 308 is executed to compensate the deblocked block for visual preference.

If step 305 determines that deblocking of the decoded block requires data of the next MB row, a first portion of the decoded block is deblocked in step 310 and the deblocked first portion is then stored into a memory in step 311. Step 312 is executed to store a second portion of the decoded block (un-deblocked second portion) into the memory. Then, step 313 is executed to access the second portion of the decoded block from the memory for deblocking when the data of the next MB row is available. The deblocked second portion is then transmitted to the image processing unit directly after deblocking in step 314. Step 315 can be executed concurrently with step 314 to transmit the deblocked first portion from the memory to the image processing unit. Then, step 308 is executed to compensate the deblocked block.

According to the aforementioned arrangement and steps, the present invention provides apparatus and methods that post-processes a picture frame with fewer memory access. The present invention distinguishes blocks that have to be deblocked with data of a next MB row and without data of the next MB row. Based on the difference, the amount of a block that has to be stored and to be accessed is different. The embodiments provide efficient video decoding and processing apparatus and method.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An apparatus for processing a picture frame comprising a plurality of macroblocks (MBs), and each MB comprises a plurality of blocks, the apparatus comprising:
   a memory;
   an image processing unit; and
   a decoder, being configured to decode a received bitstream to generate a plurality of decoded blocks, and to deblock the decoded blocks with the following operations for removing visual blocking effect:
   deblocking a decoded block to generate a deblocked block and transmit the deblocked block to the image processing unit when deblocking of the decoded block does not require data of a next MB row; and
   deblocking a first portion of the decoded block requiring data of the next MB row to generate a first deblocked portion of a deblocked block and storing the first deblocked portion and a second portion of the decoded block requiring no data of the next MB row in the memory when deblocking of the decoded block requires data of the next MB row, wherein the decoder further accesses the second portion of the decoded block from the memory to generate a second deblocked portion of the deblocked block through deblocking and transmits the second deblocked portion to the image processing unit when the data of the next MB row is available;
   wherein the memory stores the decoded blocks and the deblocked blocks generated by the decoder; and
   the image processing unit receives the deblocked blocks from the decoder or from both the decoder and the memory for compensating the deblocked blocks for visual preference.

2. The apparatus of claim 1, wherein the image processing unit conducts film grain processing for each deblocked block and the image processing unit comprises:
   an averaging unit for calculating an average value of pixels in each deblocked block; and a first searching unit for searching a lookup table according to the average value to derive supplemental enhancement information of the deblocked block;

a pseudo random number generator for generating a reference value based on a predefined random value;

a second searching unit for generating film grain compensating values for the deblocked block based on searching a database with the reference value and supplemental enhancement information of the deblocked block; and a blender for combining the film grain compensating values with pixels of the deblocked block.

3. The apparatus of claim 1, wherein the image processing unit stores the deblocked blocks after compensation back into the memory.

4. The apparatus of claim 1, wherein the image processing unit comprises a scaler for scaling the deblocked blocks into a desired dimension.

5. The apparatus of claim 1, wherein the image processing unit comprises a deinterlacer for deinterlacing the deblocked blocks.

6. The apparatus of claim 1, wherein the second deblocked portion of the deblocked block retrieved from the decoder comprises last N rows of pixels in the deblocked block, and N is predetermined by a corresponding encoder.

7. The apparatus of claim 1, wherein the decoder checks a picture header of the picture frame to determine if deblocking is required for the picture frame, if the picture header indicates deblocking is not required, the decoder disables deblocking procedures and sequentially transmits the decoded blocks to the image processing unit for compensating the decoded blocks for visual preference.

8. The apparatus of claim 1, wherein each MB comprise four luminance blocks and two chrominance blocks.

9. A method for processing a picture frame comprising a plurality of macroblocks (MBs), and each MB comprises a plurality of blocks, the method comprising the steps of:

(a) decoding a received bitstream by a decoder to generate a plurality of decoded blocks;

(b) determining if deblocking of a decoded block requires data of a next MB row by the decoder;

(c) after the step (b), deblocking the decoded block by the decoder to generate a deblocked block and transmit the deblocked block to an image processing unit when deblocking of the decoded block does not require data of a next MB row;

(d) after the step (b), deblocking a first portion of the decoded block requiring data of the next MB row by the decoder to generate a first deblocked portion of a deblocked block and storing the first deblocked portion and a second portion of the decoded block requiring no data of the next MB row in a memory when deblocking of the decoded block requires data of the next MB row;

(e) after the step (d), accessing the second portion of the decoded block from the memory by the decoder to generate a second deblocked portion of the deblocked block through deblocking and transmitting the second deblocked portion to the image processing unit by the decoder when the data of the next MB row is available;

(f) compensating the deblocked block for visual preference by the image processing unit.

10. The method of claim 9, wherein the second deblocked portion of the deblocked block comprise last N rows of pixels in the deblocked block, and N is predetermined by a corresponding encoder.

11. The method of claim 9, wherein the step of compensating the deblocked block for visual preference comprises:

conducting film grain processing for each deblocked block to generate film grain compensating values; and blending the film grain compensating value with pixels of the deblocked block.

12. The method of claim 9, further comprising the step of storing the deblocked blocks after compensation back into the memory.

13. The method of claim 9, wherein the step of compensating the deblocked block for visual preference comprises scaling the deblocked blocks into a desired dimension.

14. The method of claim 9, wherein the step of compensating the deblocked block for visual preference comprises deinterlacing the deblocked blocks.

15. The method of claim 9, further comprising:

checking a picture header of the picture frame to determine if deblocking is required for the picture frame; and if the picture header indicates deblocking is not required, disabling deblocking procedures and sequentially transmitting the decoded blocks to the image processing unit for compensating the decoded blocks for visual preference.

16. The method of claim 9, wherein each MB comprise four luminance blocks and two chrominance blocks.

* * * * *